April 16, 1946.  E. MARTIN  2,398,713
GOVERNOR CONTROL
Filed Dec. 17, 1942
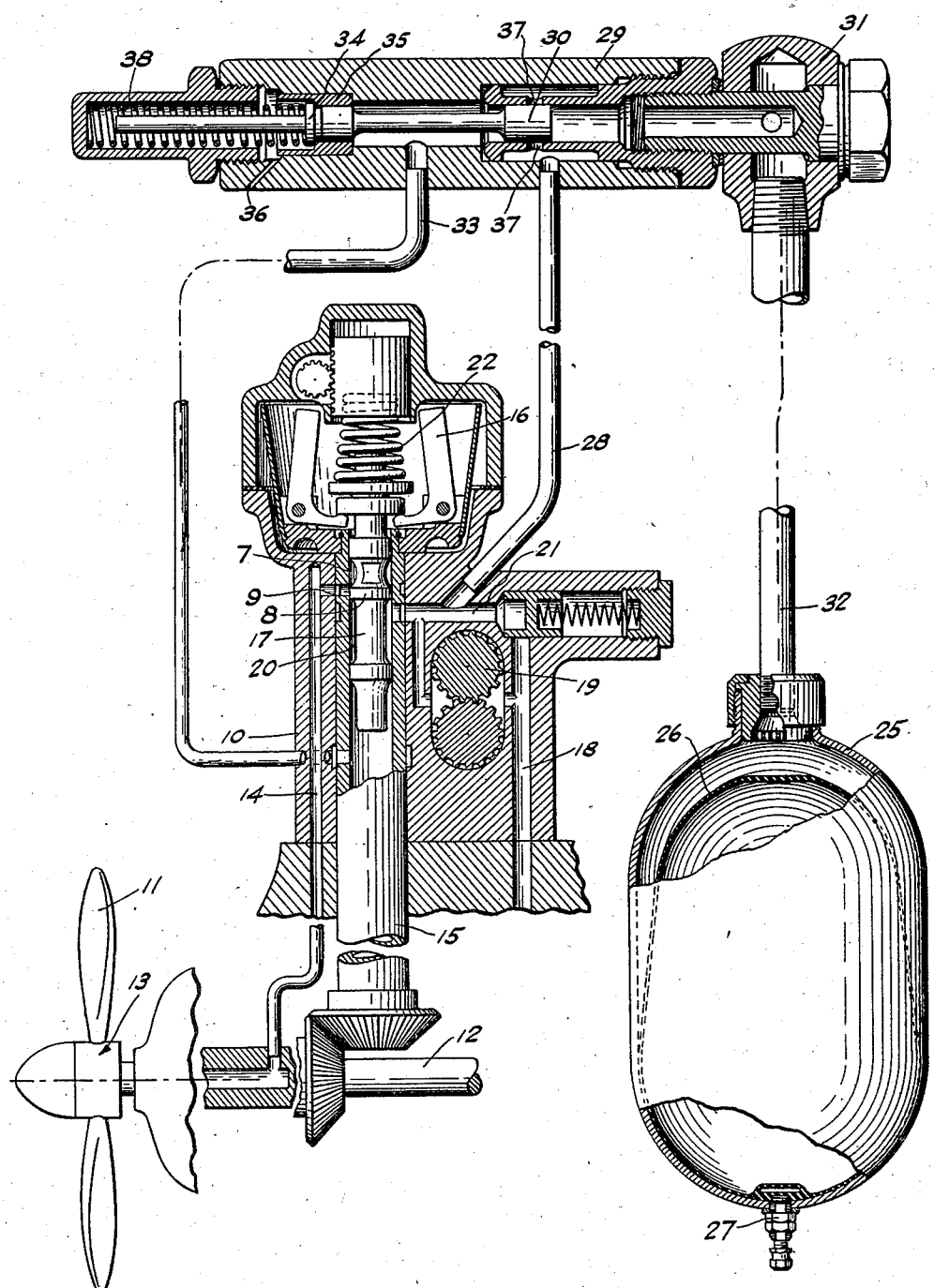
INVENTOR
*Erle Martin*
BY
*Charles L. Shelton*
ATTORNEY.

Patented Apr. 16, 1946

2,398,713

UNITED STATES PATENT OFFICE 2,398,713

GOVERNOR CONTROL

Erle Martin, West Hartford, Conn., assignor to United Aircraft Corporation, East Hartford, Conn., a corporation of Delaware Application December 17, 1942, Serial No. 469,377

2 Claims. (Cl. 264—14)

This invention relates to fluid operated governors and particularly to a governor for controlling the pitch of an aeronautical propeller.

An object of this invention is to provide means for supplying fluid under pressure to a propeller pitch control governor for a limited time from an auxiliary source, such as an accumulator, when the normal supply of fluid for effecting pitch control is interrupted.

Another feature is that an accumulator comprising a metal casing having a collapsible air filled bag within it is connected to the normal source of supply so that, upon failure or interruption of the normal source of supply, a limited amount of operating fluid may be available for the governor for a limited time or until the normal source is resumed.

A further object of the invention is to provide a safety valve, between the accumulator and governor, constantly urged toward its closed position by a spring but normally held in its open position by the pressure of the operating fluid so that escape of governing fluid is prevented in the event the accumulator is disconnected or fails.

Another advantageous feature is that the safety valve in its closed position permits fluid to leak slowly past the valve into the accumulator from the normal supply to initially charge the accumulator, and, as soon as the accumulator is partially charged to a pressure sufficient to open the valve against its spring, charging of the accumulator may continue at a rapid rate.

It is also an object of the invention to retain the safety valve in its open position by accumulator pressure during normal operation of the governor so that upon failure of pitch controlling fluid from its normal source, fluid will instantly be available to the governor valve and to the pitch controlling mechanism directly from the accumulator.

With the above and other objects in view the invention may include the features of construction and operation set forth in the following specification and illustrated in the accompanying drawing.

I have shown the invention embodied in a standard form of pitch control governor, but it will be understood that the invention can be otherwise embodied and that the drawing is not to be construed as defining or limiting the scope of the invention, the claims appended to this specification being relied upon for that purpose.

The drawing is a central longitudinal view in section of the mechanism, some of the parts being shown diagrammatically.

In its preferred aspect, the invention may include the following principal parts: First, a centrifugal type governor for supplying fluid under pressure past a valve controlled by the governor to an aeronautical propeller pitch controlling device; second, an accumulator connected to the normal source of fluid supplied to the governor; third, a valve between the governor fluid supply and accumulator permitting fluid to leak past the valve in its closed position to initially charge the accumulator, said valve being maintained open thereafter by the pressure of fluid within the accumulator; and fourth, spring means normally urging this valve toward its closed position in order to close the valve in the event the accumulator becomes disconnected from the governor or becomes damaged and its pressure fails.

Referring to the drawing, there is shown diagrammatically a standard form of governor 10 for controlling a propeller pitch changing device 13. The propeller 11 driven by shaft 12 has the pitch of its blades varied by the admission of fluid under pressure to its pitch changing device 13 through conduit 14. Rotation of shaft 12 rotates a vertical sleeve 15 through suitable driving connections and varies the position of the fly weights 16 in accordance with their speed of rotation. This varies the vertical position of valve stem 17, slidable within sleeve 15, with changes in speed of the propeller. Fluid under pressure from any suitable source is supplied to conduit 18 and has its pressure raised by booster pump 19. This fluid under high pressure enters valve chamber 20 through dump outlet 21 and is admitted to conduit 14 whenever land 8 is lifted sufficiently to uncover port 9.

As the above described parts are or may be those usually found in a standard form of propeller pitch governor further description is not thought to be necessary. It will suffice to state that by adjustment of spring 22, manually or otherwise, propeller 11 may be set for any desired R. P. M. and maintained at that speed. When the propeller speed is below the desired value the fly weights permit land 8 to assume the position shown, in which fluid is bled from conduit 14 past land 8 and into the hollow valve stem 17 through port 7, and thence through sleeve 15 to the engine sump. This causes a reduction in propeller pitch. When the propeller speed is too high the fly weights will raise stem 17 until land 8 rises slightly above port 9 permitting pressure fluid to pass from the pump outlet into conduit 14 to increase the propeller pitch.

During certain maneuvers, such as a prolonged inverted flight, fluid may not be supplied to the conduit 18 continuously. During such temporary interruptions to normal fluid supply it is desirable that an auxiliary supply of fluid be available in sufficient volume and pressure to continue proper functioning of the pitch changing device until the normal supply is again available. For that purpose an accumulator 25 is provided and adapted to be connected to valve chamber 20 as will be described.

The accumulator 25 includes a casing, preferably of metal, within which is an elastic and collapsible bag 26. The bag 26 is shown in its normal or deflated condition, but may be inflated with air to a predetermined pressure, for example, 300 pounds, through a connection 27 preferably fastened as shown to the accumulator casing near one end. The bag when inflated completely fills the casing.

When booster pump 19 is started fluid under pressure will pass through conduit 28, and leak through ports 37, past valve 30, and thence through swivel connection 31 to conduit 32. The valve 30 has a loose fit in its closed position shown in the drawing in order to permit the fluid to leak past it. Valve 30 is biased by spring 38 to closed position, this position being determined by the engagement of the head 34 on the valve stem, with the shoulder 35. When the pressure in conduit 32 reaches approximately 300 pounds valve 30 will be forced to the left permitting fluid to flow freely to conduit 32 and into the accumulator 25 by compressing the bag 26.

The casing 29 for valve 30 may contain a drain conduit 33 leading as shown to the interior of sleeve 15. A drain opening 36 from the casing 29 beyond the head 34 may be provided to allow fluid passing the head 34 to be exhausted to the engine sump which may in turn be vented to the atmosphere.

In operation the accumulator 25 is maintained charged with governor controlling fluid furnished by the booster pump 19 but upon interruption of the supply of fluid by this pump the accumulator admits fluid at booster pump pressure to the outlet 21 and to the governor valve 17. As soon as fluid is again supplied to this outlet 21 from the normal source, that is by pump 19, the accumulator is again replenished to its maximum pressure. Should the accumulator become damaged or disconnected from any cause valve 30 immediately closes and (except for leakage past the valve 30) prevents loss of fluid from the system.

It is to be understood that the invention is not limited to the specific embodiment herein illustrated and described, but may be used in other ways without departure from its spirit as defined by the following claims.

I claim:

1. A governor comprising in combination, a source of fluid under pressure, a valve for controlling the flow of fluid from said source to a device to be controlled, an accumulator for a quantity of fluid under pressure connected to said source and said valve to receive fluid from said source and deliver fluid to said valve, a second valve located in the connection between said accumulator and said source and said control valve, resilient means for closing said second valve when the pressure in said accumulator falls below a predetermined lower pressure, and means subject to the pressure in said connection and opposing said resilient means and holding said second valve open as long as the pressure in said accumulator or said source remains above said predetermined lower pressure, whereby fluid may flow freely to and from said accumulator at pressures above said lower pressure, and fluid under pressure may be supplied to said control valve when the supply from said source is insufficient.

2. In combination, a governor, a source of fluid under pressure, an accumulator for storing a quantity of fluid under a predetermined pressure connected to said source and said governor, and a valve, spring biased to closed position, between said accumulator and said governor and said source and provided with a leakage opening when in closed position to permit a relatively small amount of fluid to pass from said source to said accumulator to initially charge said accumulator to a predetermined lower pressure, said valve being normally held in its open position by fluid above said predetermined lower pressure in said accumulator to permit free flow of fluid into and from said accumulator, at pressures above said lower pressure whereby said accumulator may be quickly charged and fluid will be available when said source is interrupted, and a spring moving said valve to its closed position when the pressure in said accumulator falls below said predetermined lower value to prevent loss of pressure from said governor and said source upon failure or disconnection of said accumulator.

ERLE MARTIN.